United States Patent [19]

Niimura

[11] Patent Number: 5,926,044
[45] Date of Patent: Jul. 20, 1999

[54] CLOCK SWITCHING DEVICE AND METHOD

[75] Inventor: Takashi Niimura, Yokohama, Japan

[73] Assignee: Kabushiki Kaisha Toshiba, Kawasaki, Japan

[21] Appl. No.: 08/933,103

[22] Filed: Sep. 18, 1997

[30] Foreign Application Priority Data

Sep. 30, 1996 [JP] Japan ..................................... 8-259627
Aug. 29, 1997 [JP] Japan ..................................... 9-233720

[51] Int. Cl.⁶ .................................................... H03K 17/00
[52] U.S. Cl. ............................................. 327/99; 327/298
[58] Field of Search .................................... 327/3, 28–30, 327/40, 41–47, 49, 99, 291, 298, 407, 141–146

[56] References Cited

U.S. PATENT DOCUMENTS 5,483,185  1/1996  Scriber et al. ............................. 327/99
5,822,289  10/1998  Inagawa et al. .......................... 369/59

FOREIGN PATENT DOCUMENTS 322618  7/1989  European Pat. Off. .
2287107  9/1995  United Kingdom .

*Primary Examiner*—My-Tran Nu Ton
*Attorney, Agent, or Firm*—Pillsbury Madison & Sutro LLP

[57] ABSTRACT

After a level of a selection signal C is changed, a currently output clock signal present at an output line is interrupted (set to be a low level) at the fall of the level of the currently output clock signal (A or B), and a switching operation is started. After the switching, the supply of an extracted clock signal to the output line is resumed when the level of the extracted clock signal (A or B) is changed. The best clock signal, which is synchronized with a plurality of source clock signals, can be provided to another system such as an IC card without increasing the number of parts. No noise is generated at a clock signal switching time, and the time required for switching can be kept to a minimum.

14 Claims, 3 Drawing Sheets

CLOCK SWITCHING DEVICE AND METHOD

BACKGROUND OF THE INVENTION

The present invention relates to a clock switching device mounted on a logic circuit or a processing device using one of a plurality of clock signals each having a different frequency, and to a clock switching method.

The use of IC cards in corporating a microcomputer has been popular. The IC card has outer connection terminals such as a power supply terminal, a clock terminal, a reset terminal, and a serial I/O. Then, the IC card can be accessed by an outer device such as a card reader/writer (hereinafter called reader/writer) through the outer connection terminals.

The clock terminal, which is one of the outer connection terminals, is used to fetch a clock signal for operating the microcomputer in the card.

In some of the IC cards, two clock signals each having a different frequency are fetched sequentially so as to perform a series of operations. In such a case, there is needed a clock switching device for selecting any one of two clock signals to be supplied to the IC card in the reader/writer, in addition to an oscillation circuit for oscillating each clock signal. Following are two examples of the clock switching device:

(1) One clock signal (c1) is input to one input terminal of a two-input AND gate (g1), and a clock selection signal is input to the other input terminal. Another clock signal (c2) is input to one input terminal of another two-input AND gate (g2), and a reverse signal of the clock selection signal is input to the other input terminal through an inverter (g3).

An output of the gate (g1) is supplied to one input terminal of a two-input OR gate (g4), and an output of the gate (g2) is supplied to the other terminal. An output of the gate (g4) is supplied to a system using the clock signal (c1) or (c2).

A method of using this circuit can be as follows:

Specifically, the level of a clock selection signal is switched such that a clock signal to be used is output from the AND gate to which the clock signal is input. Since allowance of the output of two clock signals is designated by one control signal, the collision of two clock signals does not occur in outputting the clock signal to the system to be used.

(2) As the other example, clock enable signals (s1) and (s2) are generated and used in place of the clock selection signals.

One clock signal (c1) is input to one input terminal of the two-input AND gate (g1), and the clock enable signal (g2) is input to the other input terminal. The other clock signal (c2) is supplied to one input terminal of the other two-input AND gate (g2), and the clock enable signal (s2) is input to the other input terminal.

The output of the gate (g1) is supplied to one input terminal of the two-input OR gate (g4), and the output of the gate (g2) is supplied to the other terminal. The output of the gate (g4) is supplied to system using the clock signal (c1) or (c2).

The following will explain the case in which the clock signal (c1) is used in this system.

First, the clock enable signals (s1) and (s2) are set to a "clock disable" state to stop the clock output to the system. From this state, the clock enable signal (s1) is set to a "clock enable" state. Thereby, the clock signal (c1) is supplied to the system. For supplying the clock signal (c2) to the system, the clock enable signal (s1) is set to a "clock disable" state. Thereafter, the clock enable signal (s2) is set to a "clock enable" state. Thereby, the clock signal (c2) is supplied to the system.

The following will explain the problems of the above conventional clock switching device.

(a) The clock signals, which are non-synchronous with the clock signals (c1) and (c2), are supplied to the system. In other words, the signals, which are not synchronized with the clock signals (c1) and (c2), are used as clock selection signals or clock enable signals. As a result, there is possibility that pulses, which are not synchronized with the clock signals (1) and (c2), are generated to an output line as noise.

(b) The number of parts to be used is increased to obtain the clock signals, which are synchronized with the clock signals (c1) and (c2).

In other words, to synchronize the clock signals to be supplied to the system with the clock signals (c1) and (c2), there is needed a synchronism circuit using two or more flip flops for each of clock signals (c1) and (c2) (that is, four or more flip flops are needed). The flip flops operate using a clock selection signal as a trigger. Then, current output clock signals (c1) and (c2) are supplied to clock inputs of the flip flop. As a result, the number of parts to be used is increased, the control circuit becomes complicated, and the manufacturing cost is increased.

(c) It takes much time for the signal to be actually switched to the clock signal after the designation of the clock switching.

In the structure using the synchronism circuit described in above item (b), an amount of time, which corresponds to the sum of two cycles of each clock signal, is needed such that a new clock signal is output on an output line after the signal is synchronized with the outputting clock signal and the output of the clock signal is stopped.

(d) The structure using two clock enable signals (s1) and (s2) described in above item (2) is limited in that these clock enable signals (s1) and (s2) are not simultaneously set to the "clock enable" state.

SUMMARY OF THE INVENTION

An object of the present invention is to provide a clock switching device, which can select one of a plurality of source clock signals to supply the best clock signal synchronized with the selected clock signal, and which can prevent noise from being generated at a clock signal switching time. Moreover, according to the present invention, there can be provided a clock switching device which can keep the time, necessary for a clock switching to a minimum.

In order to achieve the above object, according to the present invention, there can be provided a clock switching device for selecting one of a plurality of clock signals whose frequencies are different from each other in accordance with a selection signal, and for supplying the clock signal to an output line, comprising:

first detecting means for detecting a level change of a currently output clock signal currently supplied to the output line after the selection signal is changed;

extracting means for extracting one of the plurality of clock signals after a predetermined delay time from the detection by the first detecting means;

second detecting means for detecting a level change of the clock signal extracted by the extracting means in accordance with the detection by the first detecting means; and output controlling means for interrupting the supply of the clock signal to the output line from the extracting means in accordance with the detection by the first detecting means, and for releasing the interruption state in accordance with the detection by the second detecting means.

A phase of the selection signal and each phase of the plurality of clock signals are independent of each other. As a result, since the supply of the clock signal is interrupted at the clock signal switching time, generation of noise is not generated in the output line.

The first detecting means has means for detecting a time point when the level of the currently output clock signal is first changed after the selection signal is changed, and the second detecting means has means for detecting a time point when the level of the clock signal extracted by the extracting means is first changed after the detection by the first detecting means. Thereby, interruption time of the supply of the clock signal can be kept to a minimum. In other words, the time required for switching the clock signal is extremely short.

The first detecting means has means for detecting a first fall of the level of the currently output clock signal after the first selection signal is changed, and the second detecting means has means for detecting a first fall of the level of the clock signal extracted by the extracting means after the detection by the first detecting means.

The clock switching device further comprises for generating first and second clock signals whose frequencies are different from each other.

The first detecting means includes a first inverter 13 for inverting the currently output clock signal being supplied to the output line, and a first flip-flop 12 having an output for providing a level of the selection signal in response to a data input to which the selection signal is supplied. The first detecting means further includes a clock input to which an output of the first inverter is supplied, and an output of the first inverter.

The extracting circuit includes a delay circuit for delaying an output of the first flip-flop by a predetermined time to output a delay signal, a first NAND gate whose one input is supplied with the first clock signal and other end is supplied with the delay signal. A second inverter inverts an output of the delay circuit. A second NAND gate 4 has one input supplied with the second clock signal and another input supplied with an output of the inverter. A third NAND gate has one input supplied with an output of the first NAND gate and another input supplied with an output of the second NAND gate.

The second detecting circuit includes a third inverter for inverting an output of the third NAND gate, and a second flip-flop having an output for providing an output level of the first flip-flop in response to a clock input to which an output of the third inverter is supplied. A data input is provided to which an output of the first flip-flop is supplied, and an output of the third inverter.

The output controlling means includes an exclusive OR gate having one input supplied with an output of the first flip-flop and another input supplied with an output of the second flip-flop. A fourth inverter is provided for inverting an output of the exclusive OR gate, and an AND gate is provided having one input supplied with an output of the third NAND gate and another input supplied with an output of the fourth inverter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
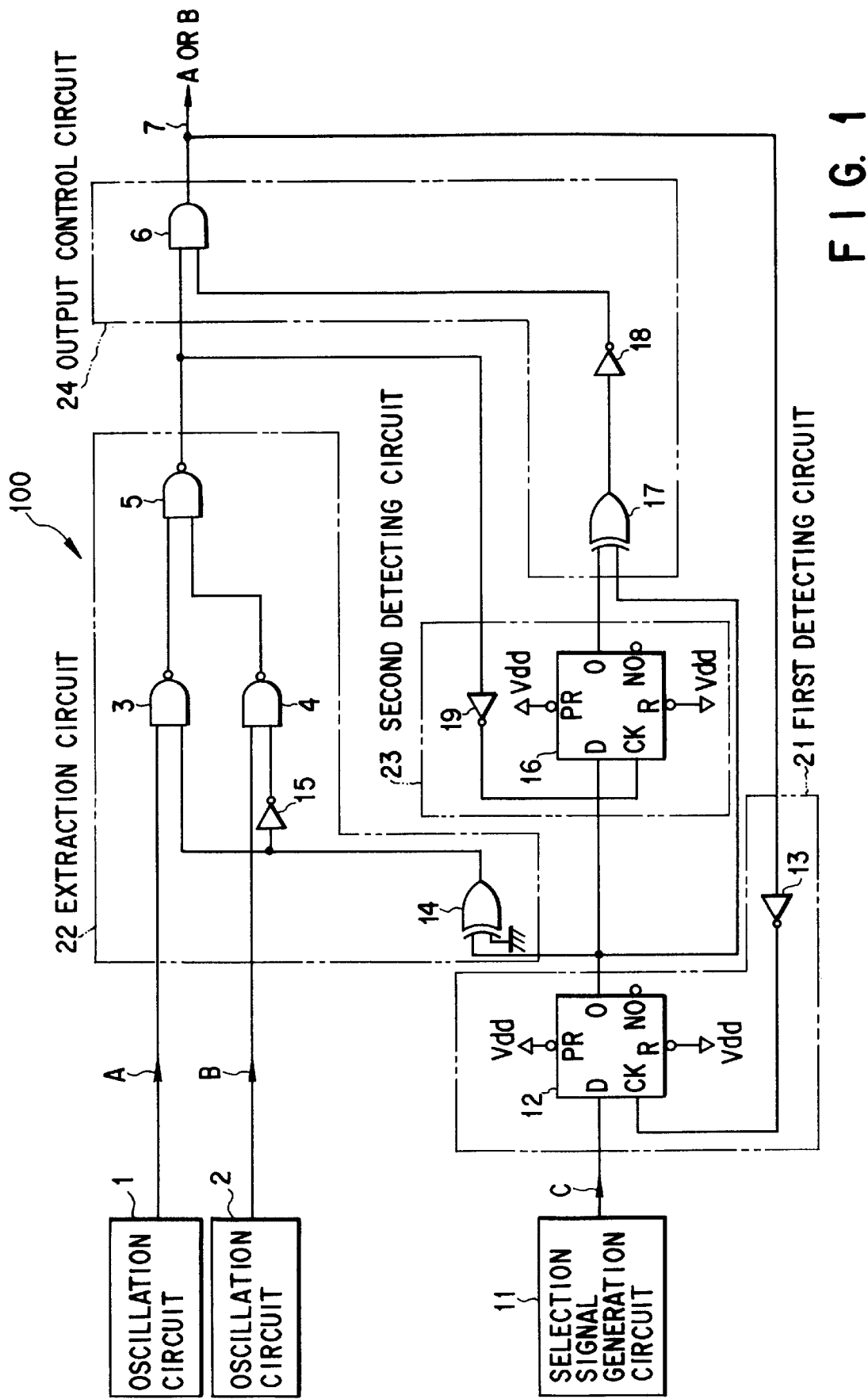
FIG. 1 is a view showing a circuit structure of a clock switching device of one embodiment of the present invention.

FIG. 1 shows the structure of a control circuit 100 for a clock switching. The control circuit 100 is mounted on a reader/writer in which an IC card is set.

An oscillation circuit 1 outputs a first clock signal A whose frequency is for example 3.5 MHz. An oscillation circuit 2 outputs a second clock signal B whose frequency is for example 4.9 MHz.

The clock signal A is supplied to one input terminal of a NAND gate circuit 3, and the clock signal B is supplied to one input terminal of a NAND gate circuit 4. Outputs of these NAND gate circuits 3 and 4 are supplied to both input terminals of an NAND gate circuit 5, and an output of the NAND gate circuit 5 is supplied to one input terminal of an AND gate circuit 6.

An output terminal of the AND gate circuit 6 is connected to an output line 7. The output line 7 is connected to a clock terminal of the IC card when the IC card is set.

A selection signal generation circuit 11 generates a selection signal C for selecting one of clock signals A and B. The selection signal C is output to be nonsynchronous with the clock signals A and B. The selection signal generation circuit 11 changes the level of the selection signal C to be high or low in accordance with the designation of the clock frequency from the IC card to be set.

The selection signal C is supplied to a set input terminal of a flip-flop circuit 12. A signal (currently output clock signal), which is currently output to an output line 7, is supplied to a clock input terminal of the flip-flop circuit 12 through an inverter 13.

An output of the flip-flop circuit 12 is supplied to both input terminals of an exclusive OR gate circuit 14. An output of the exclusive OR gate circuit 14 is supplied to the other input terminal of the NAND gate circuit 3. Moreover, an output of the exclusive OR gate circuit 14 is supplied to the other input terminal of the NAND gate circuit 4. The exclusive OR gate circuit 14 functions as a time delay element, which supplies a predetermined time delay to the passage of the signal.

The output of the flip-flop circuit 12 is supplied to each of a set input terminal of a flip-flop circuit 16 and one input terminal of an exclusive OR gate circuit 17. Then, an output of the exclusive OR gate circuit 17 is supplied to the other input terminal of the AND circuit 6 through an inverter 18.

The clock signal, which is extracted by the NAND gate circuit 5 to be supplied to the AND gate circuit 6, is supplied to a clock input terminal of the flip-flop circuit 16 through an inverter 19.

The basic operation of the clock switching circuit can be explained as follows:

Specifically, if the clock selection signal C is set to be a high level, the clock signal A is output to the output line 7. If the clock selection signal C is set to be a low level, the clock signal B is output to the output line 7.

In the above-mentioned logic structure, there is structured a first detection circuit 21 for detecting the level change (fall) of the output clock signal (A or B) after the level of the selection signal C is changed.

An extraction circuit 22 comprises the NAND gate circuits 3, 4, and 5, exclusive OR gate circuit 14, and inverter 15. After a predetermined delay time from the detection of the first detection circuit 21, the extraction circuit 22 extracts either the clock signal A or B to be supplied to the output line 7. A second detection circuit 23 comprises the flip-flop circuit 16 and inverter 19. The second detection circuit 23 detects the level change (fall) of the clock signal extracted by the extraction circuit 22 after the detection of the first detection circuit 21.

An output control circuit 24 comprises the AND gate circuit 6, exclusive OR gate circuit 17, and inverter 18. The output control circuit 24 interrupts the supply of the clock signal to the output line 7 from the extraction circuit 22 in accordance with the detection of the first detection circuit 21. Then, the output control circuit 24 releases the interruption state in accordance with the detection of the second detection circuit 23.

The function of the above-mentioned structure will be explained with reference to the time chart of FIG. 2 as follows:

First, the following will explain an operation of switching the clock signal A to the clock signal B in a state that the clock signal A is output to the output line 7.

If the clock selection signal C is changed to the low level from the high level to be non-synchronous with the currently output clock signal A, a fall in the level of the currently output clock signal A, appears on the output stage of the flip-flop 12.

At this time, the input of the exclusive OR gate circuit 17 forms the exclusive OR sum of the low level A (extracted and output from NAND gate 5) and the lower level B, and the exclusive OR gate 17 outputs the high level. The output of the exclusive OR gate 17 is transmitted to the input of the AND gate circuit 6 through the inverter 18. As a result, the output line 7 is set to be a low level during a period $T_A$. In other words, the output line 7 is interrupted and the supply of the clock signal to the system is prohibited.

At a little later time (corresponding to the delay time of the exclusive OR gate circuit 14), the output of the flip-flop circuit 12 is supplied to the NAND gate circuit 3 so as to be transmitted to the NAND gate circuit 4 through the inverter 15. Thereby, the clock signal B is extracted in place of the clock signal A, which is extracted so far. At this time, the NAND gate circuit 5 outputs the high level for a short period time $T_B$. The extracted clock signal B is to the AND gate circuit 6.

At the extraction switching time, the pulse signal (noise: $T_B$), which is different from the clock signal, is generated from the NAND gate circuit 5. However, since the output line 7 of the AND gate circuit 6 is interrupted by the low level output of the inverter 18, the pulse signal (noise) is not generated onto the output line 7.

The extracted clock signal B is supplied to the clock input terminal of the flip-flop circuit 16 through inverter 19, and the state of the clock selection signal C is generated in the output stage of the flip-flop circuit 16 by the fall of the level of the clock signal B. Thereby, the outputs of both flip-flop circuits 12 and 16 are set to be a low level, and the output of the exclusive OR gate circuit 17 to which the outputs of the flip-flop circuits 12 and 16 are supplied is set to be a low level.

The low level signal output from the exclusive OR gate 17 is supplied to the AND gate circuit 6 through inverter 18. Thereby, the interruption of the output line 7 is released, and the supply of the clock signal B to the system is allowed.

Figure 2:
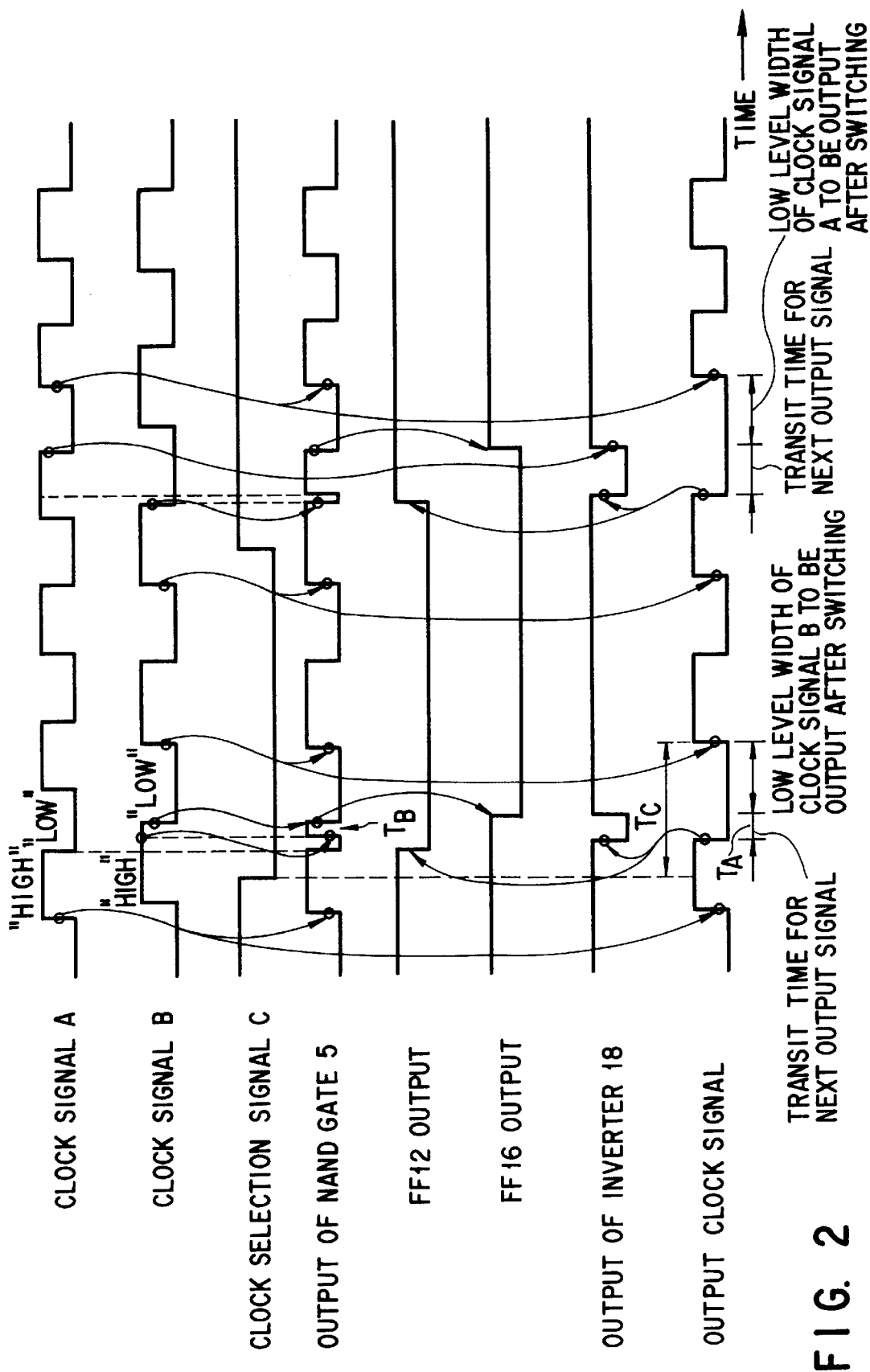
FIG. 2 is a time chart for explaining an operation of the device of FIG. 1.

In FIG. 2, the timing chart after the clock selection signal C is changed from the low level to the high level shows an operation of switching the supply of the clock signal to the other device such as an IC card from the clock signal B to the clock signal A. Since this operation is the same as the above-mentioned operation, the specific explanation is omitted.

The following will explain the delay time $T_C$, which extends from the time when the level of the clock selection signal C is changed to the time when the level of the extracted clock signal first rises after the extracted clock signal is output to the output line 7.

Delay time $T_C$ becomes maximum when the level of the clock selection signal C changes simultaneously with the fall of the currently output clock signal and the level of the extracted clock signal falls simultaneously with the fall of the currently output clock signal. At this time, delay time $T_C$ corresponds to time obtained by adding a half cycle of the extraction clock to the sum of cycle PA of the clock signal A and cycle PB of clock signal B.

In other words, time $T_C$ can be kept to at the most the sum of one cycle of clock signal A, one cycle of clock signal B, and the half cycle of the extraction clock.

Thus, the switching operation is started at the time of the fall of the level of the currently output clock signal in the output line 7. Then, the supply of the extracted clock signal to the output line 7 is allowed at the time of the fall of the level of the extracted clock signal after switching. As a result, the number of parts such as the flip-flop circuit and the gate circuit can be restrained as compared with the conventional case. Under this state, the best clock signal, which is synchronized with each of the source clock signals A and B, can be selected and output. Thereby, the manufacturing cost can be reduced, and noise can be prevented from being generated at the switching time (extraction switching time). Moreover, the time required for clock switching can be kept to a minimum.

Figure 3:
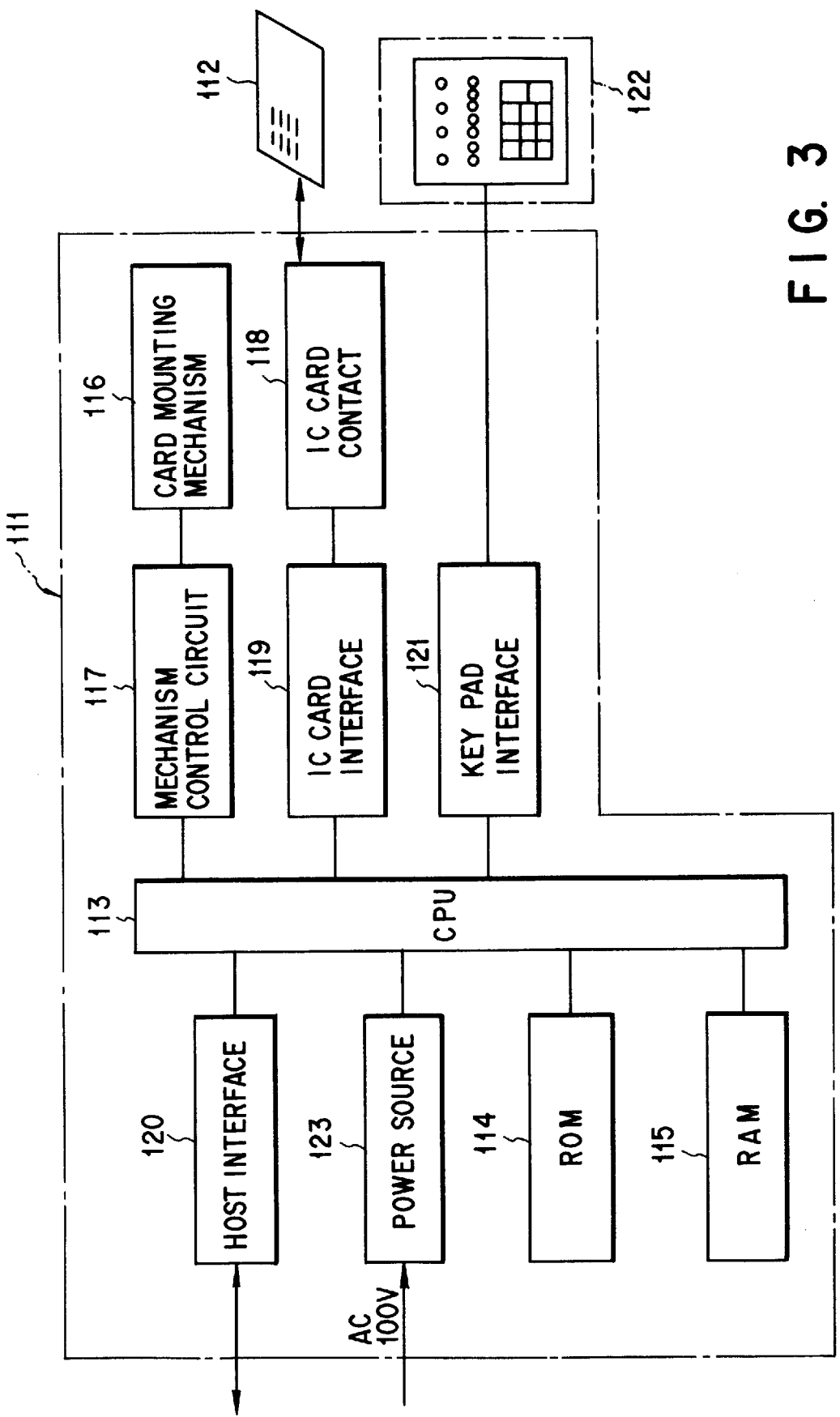
FIG. 3 is a block diagram of a reader/writer of the device of FIG. 1.

FIG. 3 shows the structure of the system to which the present invention is applied.

In FIG. 3, reference numeral 111 is a reader/writer. Data receiving and transmission are performed between reader/writer 111 and an IC card 112 in accordance with a predetermined communication protocol, and is performed communication between reader/writer 111 and a host computer.

As shown in FIG. 3, reader/writer 111 has a CPU 113. CPU 113 is connected to a ROM 114 and a RAM 115 through a bus. ROM 114 stores a program for, e.g., communication control.

Reference numeral 116 is a card mounting mechanism on which IC card 112 is mounted. The card mounting mechanism 116 is controlled by a mechanism control circuit 117. The mechanism control circuit 117 is controlled by CPU 113.

Reference numeral 118 is an IC card contact, which is electrically connected with IC card 112. CPU 113 receives and transmits data of IC card 112 through an IC card interface 119.

Reference numeral 120 is a host interface for connecting the host computer to CPU 113.

Reference numeral 121 is a key pad interface for connecting to a keyboard (key pad) 122.

Moreover, reference numeral 123 is a power supply source of reader/writer 111.

A power supply Vcc, a clock signal Clk, a ground level GND, and a reset signal RST are supplied to IC card 112 from the reader/writer 111 through the IC card contact 118.

IC card 112 has an MPU for controlling and calculating data receiving and transmitting, and a memory connected to the MPU through the bus. Communication between IC card 112 and the reader/writer 111 is performed based on the predetermined protocol.

The control circuit 100 for clock switching shown in FIG. 1 is provided in the IC card interface 119. CPU 113 provides instruction of switching the protocol to the IC card interface 119 in the following cases:

Specifically, one case is that CPU 113 receives a switching command of the protocol from the host computer through the host interface 120; and the other case is that the protocol is switched based on protocol type data sent from the IC card 112.

As a result, the selection signal generation circuit 11 of the control circuit 100 outputs the selection signal C in accordance with the protocol to be switched. Then, a predetermined clock signal is selected, and supplied to the IC card 112 through the IC card contact 118.

The above embodiment applies the present invention to the reader/writer in which the IC card is set. However, the present invention can be applied to other devices if a plurality of clock signals each having a different frequency are used.

As mentioned above, according to the structure of the control circuit 100 of the present invention, the switching operation is started when the level of the currently output clock signal of the output line after the level of the clock switching signal C is changed. Then, the supply of the extracted clock signal to the output line is allowed when the level of the extracted clock signal after switching is changed.

According to this structure, one of the plurality of source clock signals is selected without increasing the number of parts, and the best clock signal, which is synchronized with the selected clock signal, can be provided. As a result, the manufacturing cost can be reduced, and noise can be prevented from being generated at the switching time. Moreover, a clock switching device is provided which keeps the time required for clock to a minimum.

Additional advantages and modifications will be readily apparent to those skilled in the art. Therefore, the invention in its broader aspects is not limited to the specific details and representative devices shown and described herein. Accordingly, various modifications may be made without departing from the spirit or scope of the general inventive concept as defined by the appended claims and their equivalents.

I claim:

1. A clock switching device for selecting one of a plurality of clock signals having different respective frequencies in accordance with a selection signal, and for supplying the clock signal to an output line, said device comprising:

a first detecting circuit supplied with said selection signal, for detecting a time of a first occurrence of a level change in a currently output clock signal currently supplied to said output line after said selection signal is changed;

an extracting circuit for extracting another of said plurality of clock signals different from said currently output clock signal after a predetermined delay time has elapsed since the detection of said first occurrence by said first detecting circuit;

a second detecting circuit for detecting a time at which a level change of the extracted clock signal extracted by said extracting circuit occurs in response to the detection by said first detecting circuit; and an output controlling circuit for interrupting the supply of the clock signal from said extracting circuit to said output line in response to the detection by said first detecting circuit, and for ceasing the interruption in response to the detection by said second detecting circuit.

2. The device according to claim 1, wherein said first detecting circuit is a single circuit and said second detecting circuit is a single circuit.

3. The device according to claim 1, wherein a phase of said selection signal and each phase of said plurality of clock signals are independent from each other.

4. The device according to claim 1, wherein said level change of said currently output clock signal comprises a fall in the level of said currently output clock signal, and wherein said level change of said extracted clock signal comprises a fall in the level of said extracted clock signal.

5. The device according to claim 1, further comprising oscillation circuits for generating first and second clock signals having different frequencies, said first detecting circuit comprising a first flip-flop for outputting a level of said selection signal in response to a level change of said currently output signal being supplied to said output line, said extracting circuit comprising a delay circuit for generating a delay signal from a level of the selection signal output from said first flip-flop, said extracting circuit further comprising a clock selecting circuit for selecting one of said plurality of clock signals to be output in response to said delay signal, and said second detecting circuit comprising a second flip-flop for outputting the signal level output by said first flip-flop in response to the clock signal output from said clock selecting circuit.

6. The device according to claim 1, further comprising an oscillating circuit for generating first and second clock signals having different frequencies;

said first detecting circuit comprising a first flip-flop having an output, a data input, and a clock input, said selection signal being supplied to said data input, said first detecting circuit further comprising a first inverter inverting said currently output clock signal and supplying the inverted currently output clock signal to said clock input of said first flip-flop;

said extracting circuit comprising a delay circuit for generating delay signal from a level of the selection signal output from said first flip-flop, a first NAND gate comprising one input supplied with said first clock signal and another input supplied with said delay signal, said extracting circuit further comprising a second inverter for inverting the output of said delay circuit, a second NAND gate comprising one input supplied with said second clock signal and another input supplied with the output of said second inverter, and a third NAND gate comprising one input supplied with the output of said first NAND gate and another input supplied with the output of said second NAND gate;

said second detecting circuit comprising a second flip-flop having an output, a data input, and a clock input, said output of said first flip-flop being supplied to said data input of said second flip-flop, said second detecting circuit further comprising a third inverter for inverting an output of said third NAND gate and providing the inverted output of said third NAND gate to the clock input of said second flip-flop;

said output controlling circuit comprising an exclusive OR gate comprising one input supplied with the output of said first flip-flop and another input supplied with the output of said second flip-flop, said output controlling circuit further comprising a fourth inverter for inverting the output of said exclusive OR gate, and an AND gate having one input supplied with the output of said third NAND gate and another input supplied with the output of said fourth inverter.

7. A card reader/writer for receiving and transmitting data from/to an IC card in accordance with a predetermined communication protocol and for performing communication between a host computer and the card reader/writer by use of a clock switching device for selecting one of a plurality of clock signals having different frequencies in accordance with a selection signal, the clock signal being supplied to an output line, said clock switching circuit comprising:

a first detecting circuit supplied with said selection signal for detecting a time of a level change in a currently output clock signal currently supplied to said output line after said selection signal is changed;

an extracting circuit for extracting one of said plurality of clock signals after a predetermined delay time has elapsed since the detection of said first occurrence by said first detecting circuit;

a second detecting circuit for detecting a time at which a level change of the extracted clock signal extracted by said extracting circuit occurs in accordance with the detection by said first detecting circuit;

an output controlling circuit for interrupting the supply of the clock signal from said extracting circuit to said output line in response to the detection by said first detecting circuit, and for ceasing the interruption in response to the detection by said second detecting circuit.

8. The card reader/writer according to claim 7, wherein said first detecting circuit is a single circuit and said second detecting circuit is a single circuit.

9. A clock switching method for selecting one of a plurality of clock signals having different respective frequencies in accordance with a selection signal and for supplying the selected clock signal to an output line, said method comprising:

detecting a level change of a currently output clock signal currently supplied to said output line after a level of said selection signal changes;

extracting one of said plurality of clock signals after a predetermined delay time has elapsed since the detection of the level change of said currently output clock signal;

detecting a level change of the extracted clock signal after the detection of the level change of said currently output clock signal;

interrupting a supply of an extracted clock signal to said output line in response to the detection of a level change of said currently output clock signal and ceasing the interruption of the supply of the extracted clock signal in response to a detection of the level change of the extracted clock signal.

10. The method according to claim 9, wherein said first detecting comprises detecting a time of a first occurrence of a level change of said currently output clock signal, and said second detecting comprises detecting a time at which a level change of the extracted clock signal occurs after the detection of said level change in said currently output clock signal.

11. A clock switching device for selecting one of a plurality of clock signals having different respective frequencies in accordance with a selection signal, the selected clock signal being supplied to an output line, said device comprising:

an oscillation circuit for generating first and second clock signals having different respective frequencies;

first detecting means for detecting a level change of a currently output clock signal currently supplied to said output line after said selection signal is changed, said first detecting means including a first flip-flop for outputting a level of said selection signal in response to said currently output clock signal;

extracting means for extracting from one of said first and second clock signals a clock signal that is different than said currently output clock signal, after a predetermined delay time elapses since the detection of the level change of said currently output clock signal by said first detecting means, said extracting means including a delay circuit for generating a delay signal from a level of said selection signal output from said first flip-flop, and a clock selecting circuit for selecting one of said first and second clock signals and outputting the selected clock signal in response to said delay signal;

second detecting means for detecting a level change of said clock signal extracted by said extracting means in response to the detection by said first detecting means of said level change of said currently output clock signal, said second detecting means including a second flip-flop for providing an output equal to a signal level output by said first flip-flop; and output controlling means for interrupting a supply of a clock signal extracted by said extracted means to said output line in response to the detection of said level change of said currently output clock signal by said first detecting means, and ceasing the interruption in response to the detection of the level change of the clock signal extracted by said extracting means by said second detecting means.

12. The device according to claim 11, wherein said selection signal comprises a phase which is independent of a phase of each of said first and second clock signals.

13. A clock switching device for selecting one of a plurality of clock signals having different respective frequencies in accordance with a selection signal, the clock signal being supplied to an output line, said clock switching device comprising:

an oscillation circuit for generating first and second clock signals having different respective frequencies;

first detecting means for detecting a level change of a currently output clock signal currently supplied to said output line after said selection signal is changed, said first detecting means comprising a first inverter for inverting the currently output signal being supplied to said output line and a first flip-flop having a data input to which said selection signal is supplied, a clock input to which an output of said first inverter is supplied, and an output for providing a level of said selection signal in response to said selection signal;

extracting means for extracting a clock signal from among said first and second clock signals, the extracted clock signal being different than said currently output clock signal, said extracting means including a delay circuit for delaying an output of said first flip-flop by a predetermined time and outputting a delay signal, a first NAND gate comprising one input supplied with said first clock signal and another input supplied with said delay signal, a second inverter for inverting an output of said delay circuit, a second NAND gate comprising one input supplied with said second clock signal and another input supplied with an output of said second inverter, and a third NAND gate comprising one input supplied with an output of said first NAND gate and another input supplied with an output of said second NAND gate;

second detecting means for detecting a level change of the extracted clock signal extracted by said extracting means in response to the detection by said first detecting means, said second detecting means including a third inverter for inverting an output of said third NAND gate and a second flip-flop having a data input to which an output of said first flip-flop is supplied, a clock input to which an output of said third inverter is supplied, and an output for providing an output level of said first flip-flop in response to said output of said third inverter; and output controlling means for interrupting a supply of the clock signal to said output line in response to the detection by said first detecting means of the level change of said currently output clock signal, and for releasing the interruption in response to the detection by said second detecting means of the level change of the extracted signal, said output controlling means including an exclusive OR gate, comprising one input supplied with an output of said first flip-flop and another input supplied with an output of said second flip-flop, a fourth inverter for inverting an output of said exclusive OR gate, and an AND gate comprising one input supplied with an output of said third NAND gate and another input supplied with an output of said fourth inverter.

14. The device according to claim 13, wherein said selection signal comprises a phase which is independent of a phase of each of said first and second clock signals.

* * * * *